May 5, 1953     C. W. DEMAREST ET AL     2,637,369
ADJUSTABLE SEAT
Filed Feb. 2, 1950     3 Sheets-Sheet 2
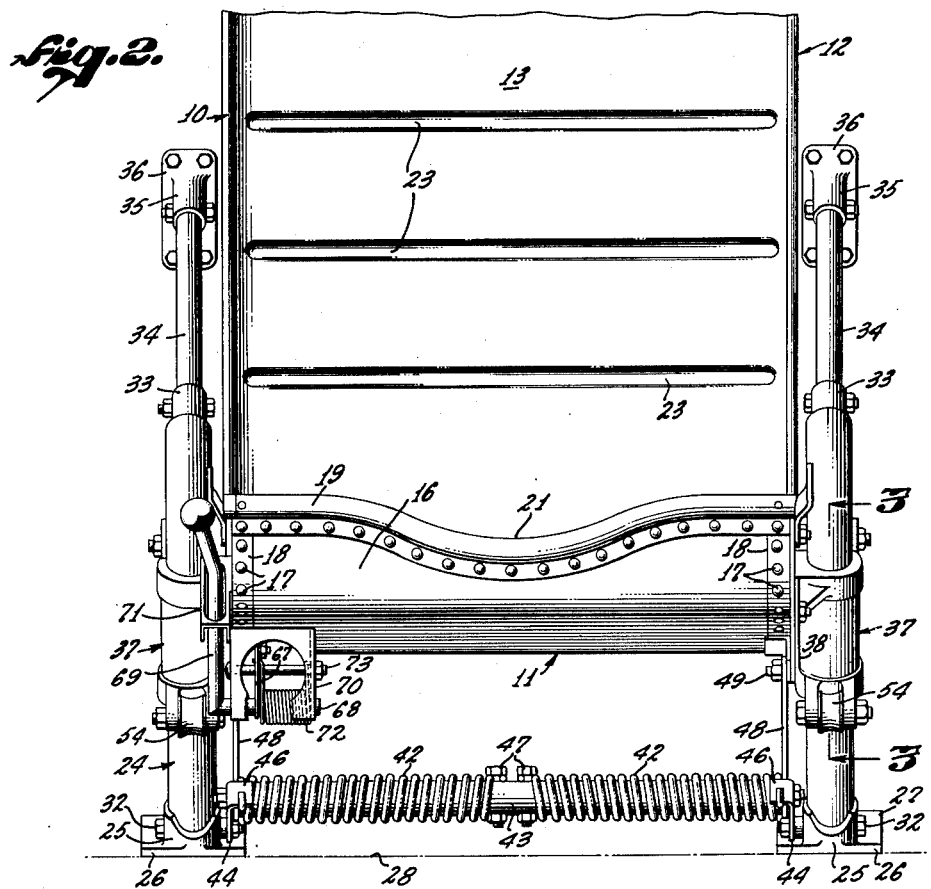
CHARLES W. DEMAREST,
JOHN T. WILLOUGHBY,
INVENTORS.
BY George J. Smyth
ATTORNEY.

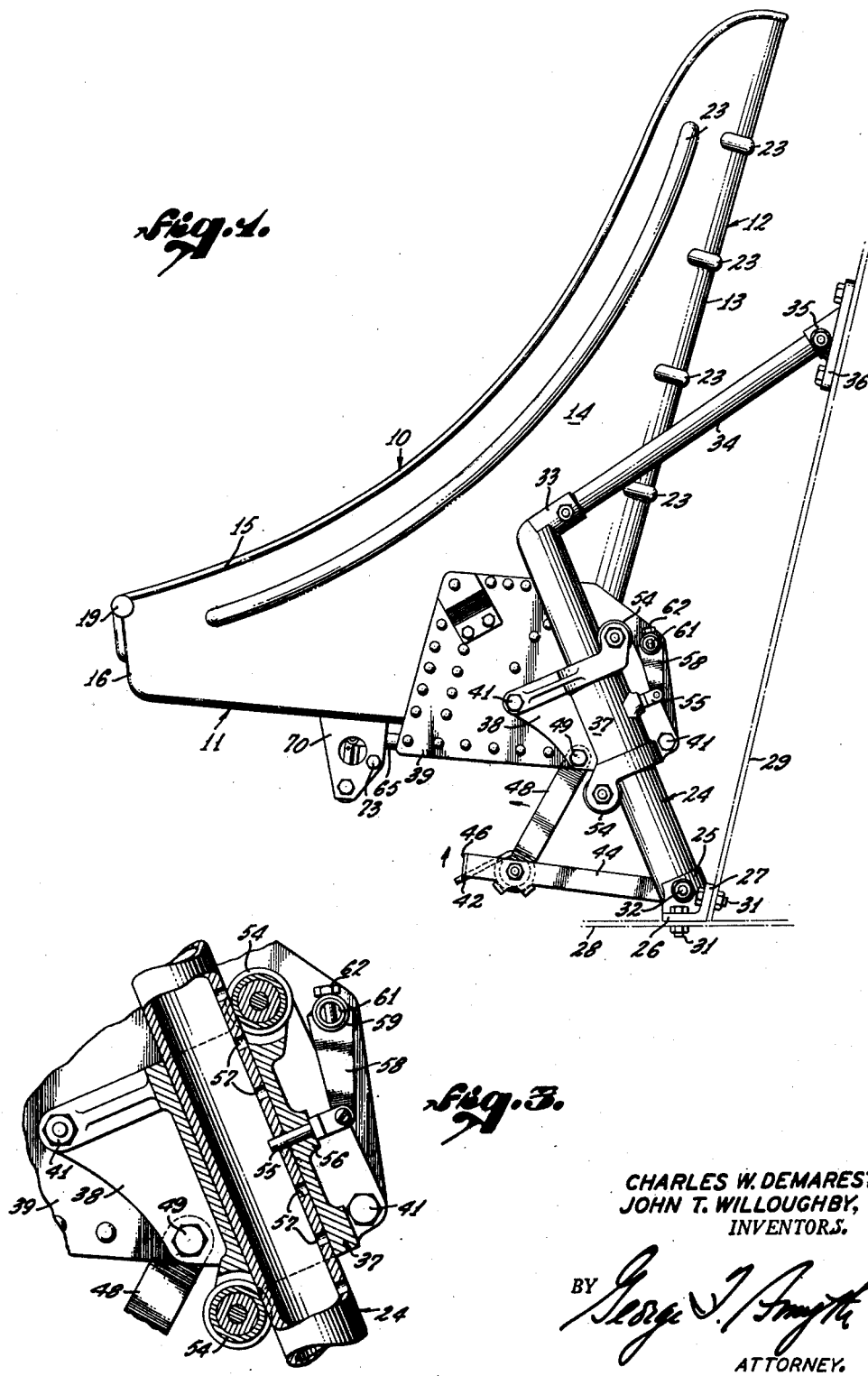

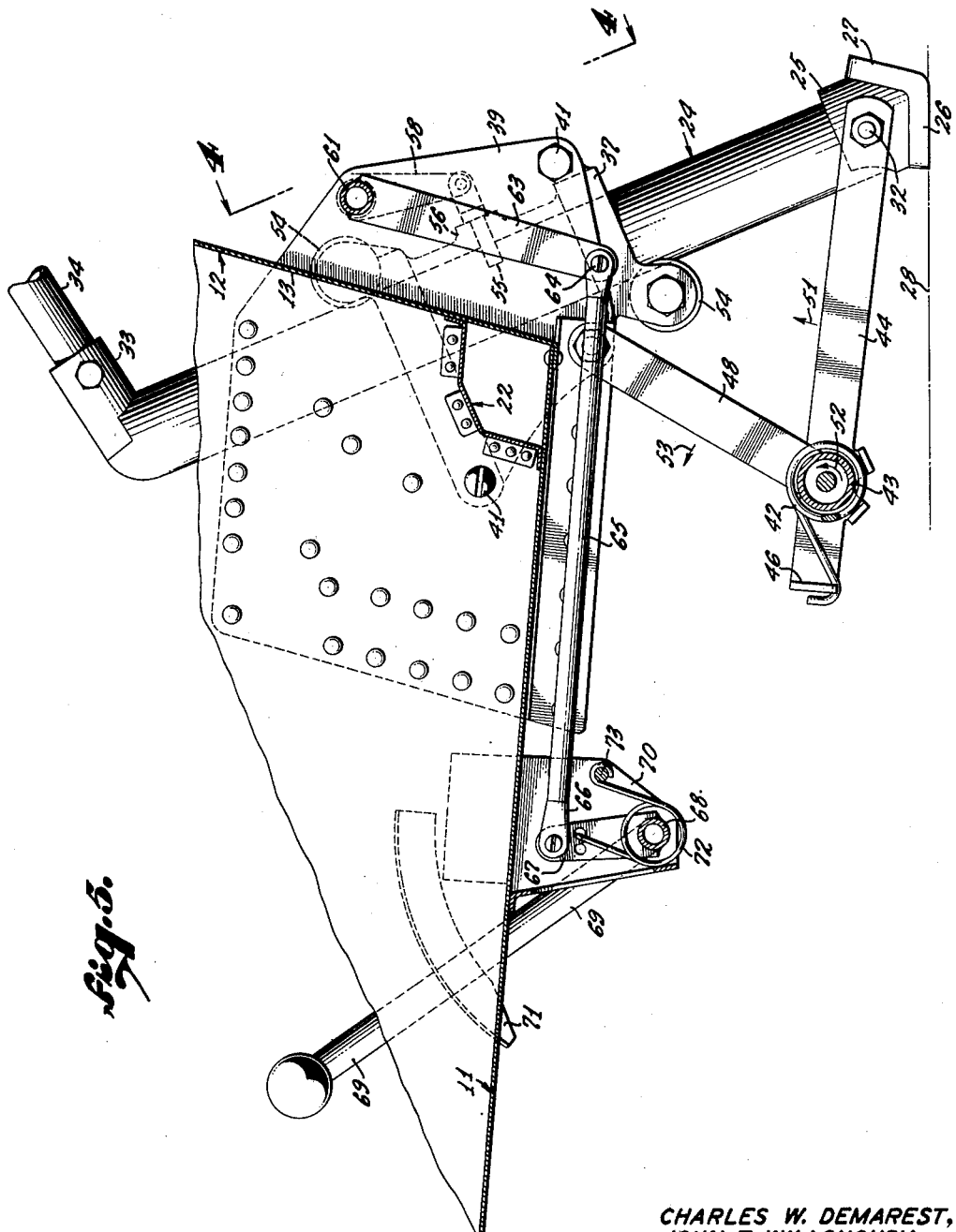

Patented May 5, 1953

2,637,369

UNITED STATES PATENT OFFICE 2,637,369

ADJUSTABLE SEAT

Charles W. Demarest, Culver City, and John T. Willoughby, Manhattan Beach, Calif., assignors, by mesne assignments, to North American Aviation, Inc., Los Angeles, Calif., a corporation of Delaware Application February 2, 1950, Serial No. 142,056

6 Claims. (Cl. 155—14)

This invention relates to adjustable seats and more particularly to a seat for an operator of a vehicle, such as an aircraft or automobile, where the position of the seat relative to operational instrumentalities must be varied to accommodate operators of varying stature.

The seat of the present invention, although particularly adapted for use as a pilot's seat for aircraft, is not necessarily limited to such a use for, as will be seen, the seat can be used in any field where the spatial change of position of the seat of the present invention is required or desirable.

As the statures of pilots operating all aircraft varies, a fixed seat can not be used with the same efficiency as a seat having means for adjusting the spatial relationship of the seat and such control instrumentalities as rudder operators and the like. Such an adjustment can be had by providing means for moving the seat in a fore and aft path substantially parallel with the longitudinal axis of the aircraft. Such an adjustment, although it provides means for varying the distance between the seat and fixed control elements, does not provide an elevational or vertical adjustment necessary to accommodate pilots of small stature as such pilots must be supported at a position higher than pilots of larger stature for efficiency of action, particularly over long periods of time.

Seats have been heretofore proposed in which the seat proper, that is the chair-like element including a seat and a back rest have been mounted for movement on track members fixed to the floor of the operator's compartment and which track members were inclined upwardly and forwardly of the floor. These prior seats were generally so supported on the track members that a force applied forwardly on the seat produced not only a forward movement of the seat but a rising one as well. A backwardly applied force produced a converse compound movement of the seat for the seat not only moved in a rearward direction but in a descending one as well.

Such seats, although they produced the spatial adjustment desired, have not been successfully used for a number of reasons, particularly as a pilot's seat. All aircraft structures are oftentimes subject to high stress loads and these prior seats could not be constructed to take the high loads encountered and still provide the ease of adjustment necessary. This was generally due to the fact that the means holding the seat in a desired position of adjustment on the track members were subjected to high concentrated stresses whenever loads, arising through "crash" landings or sudden changes in direction of flight or acceleration of the aircraft, were imposed on the seat.

The seat of the present invention, as previously mentioned, is particularly adapted for use in aircraft for it includes a supporting structure which provides the necessary adjustment and yet will take the extremely high stress loads oftentimes encountered in the flight of an aircraft. The supporting structure comprises a pair of tubular track elements adapted to be mounted within the pilot's compartment to extend upwardly and forwardly within this compartment. The seat proper, which includes a seat element and a back rest, is supported between the track elements through carriages movable therealong and rigidly fixed to the opposite sides of the seat. The seat is, therefore, suspended between the track and as the carriages are movable longitudinally of the track elements, the seat is movable in a path fixed by the track elements. As the track elements extend upwardly and forwardly in the compartment, movement of the carriages and consequently the seat in one direction produces a forward as well as an ascending movement of the seat while movement of the carriages in the opposite direction produces a rearward as well as a descending movement of the seat.

As the carriages include means engaging the opposite surfaces of the track elements, all forces exerted on the seat are carried through the carriages to the tubular track elements which are designed and constructed to take the high concentration loads which can be expected.

Each carriage is formed with a detent means engageable with cooperating means of the track element on which it is movably mounted for holding the carriages in preselected positions on the track elements. Thus the seat can be moved into and held in a desired position of adjustment within the pilot's compartment. The detent means serve merely as a means for holding the carriages in predetermined positions on the track elements and do not take the loads imposed on the chair due to "crash" landings, sudden changes of direction, and acceleration. This structural arrangement obviates the difficulties had in previously proposed chairs mounted on track elements inclined to floor structure for in such chairs, the means holding the chair in the desired position of adjustment relative to the track elements generally took the loads imposed on the chair in the flight of the aircraft.

To facilitate the ease of adjustment of the chair of the present invention, resilient means are included for normally urging each carriage to a position at the upper end of the track elements. This means is so incorporated into the supporting structure that the chair will normally be urged upwardly and forwardly of the compartment if the pilot tends to remove his weight from the seat proper. Thus, as soon as the detent means are moved out of engagement with the cooperating means on the track elements and the pilot raises his body from the seat proper, the latter will move upwardly and forwardly within the compartment.

On the other hand if the detent means are released from engagement with the cooperating means on the track elements, the weight of the pilot and his gear is just sufficient to overcome the thrust of the resilient means to the end that the carriages will slowly move downwardly of the track elements to a new position within the pilot's compartment. Once the seat has moved into the desired new position of adjustment within the compartment, the detent means can again be released for engagement with the cooperating means of the track elements to hold the seat in the new position of adjustment.

Other features and advantages of the present invention will be hereinafter apparent from the following description, particularly when taken in connection with the accompanying drawings, in which Figure 1 is a side elevational view of the chair of the present invention shown mounted within the compartment of an aircraft;

Figure 2 is a front elevational view of the chair;

Figure 3 is a section taken along line 3—3 of Figure 2;

Figure 4 is a fragmentary view in elevation taken from the position indicated by line 4—4 of Figure 5; and Figure 5 is a fragmentary view, partly in section and partly in elevation, and showing on an enlarged scale the supporting structure of the seat.

The adjustable seat of the present invention, referring now to the drawing and more particularly to Figures 1 and 2 thereof, comprises a chair-like element 10 which forms the seat proper and includes a seat member 11 and a back rest 12. The back rest comprises a sheet metal panel 13 formed with laterally extending side members or wings 14, the free edges of which are smoothly curved as shown in Figure 1, and rolled to form a cylindrical strengthening element 15 coextensive with the free edges and receiving a rod-like reinforcing member, not shown. The seat member 11, also formed of a suitable sheet metal, is connected to and supported by the back rest and to this end the lower free edges of the panel 13 and side members 14 of the back rest are formed with inturned flanges, not shown, to which the seat member is rigidly fixed by fastening elements, such as rivets.

The forward edges of the seat member 11 is provided with an upturned flange 16, the opposite edges of which are secured by rivets 17 to the inturned flanges 18 carried by the forward edges of the side members 14 of the back rest 12. A rolled reinforcing element 19 is fixed to the upper edges of the flange 16 which may be cut away centrally thereof, as shown, to form a foot-receiving depression 21, the purpose of which will be hereinafter more fully explained.

To reinforce the seat 10, a torsion resisting element 22 is preferably mounted at the intersection of the seat member 11 and the back rest 12. This element, as best seen in Figure 5, is formed by suitably shaping a sheet metal member and connecting the same between the adjacent inner faces of the side members 14 as well as to the contiguous faces of the panel 13 of the back rest 12 and the upper face of the seat member 11. It will be seen that the box-like frame member thus formed will render the seat extremely rigid and highly resistant to twisting forces.

To further reinforce the seat and to render the same extremely rigid for the gauge of the metal used to fabricate the elements thereof, the latter may be formed with a plurality of spaced, integral reinforcing columns such as indicated at 23.

It will be seen that the seat member 11 and its flange 16, the side members or wings 14, the back rest 12, and the forwardly facing wall of the torsion resisting frame 22 form a box-like receptacle which is of such a size and shape as to receive a seat pack parachute and other gear such as used by pilots today.

The seat 10 is mounted between spaced apart track elements formed, in the illustrated embodiment of the invention, by a pair of relatively heavy walled, tubular members 24. The members 24 are mounted within the pilot's compartment of the ship at an angle inclined to the vertical and extend upwardly and forwardly within the compartment in parallel relationship.

In the now preferred embodiment of the invention, the tubular members 24 are mounted at their lower ends in socket elements 25 provided with angularly related mounting flanges 26 and 27 adapted to be held, respectively, in facewise engagement with the floor member 28 and a bulkhead 29 defining in part the pilot's compartment of the aircraft. Each flange is secured to its respective structural part by fastening elements, such as the bolts shown at 31. A fastening element, such as the bolt 32, holds the lower end of each tubular member 24 in its respective socket element 25.

It will be seen that the longitudinal axis of each socket member 25 extends upwardly and forwardly of the floor element 28 and consequently holds each tubular member 24 in a corresponding position. To rigidly hold each of the tubular members 24 in the desired position within the pilot's compartment, the upper end of each member 24 carries a laterally extending socket element 33 in each of which is securely mounted the one end of an elongate tubular support 34. The opposite free ends of the supports 34 are secured within socket members 35, each formed with a mounting flange 36 rigidly bolted to the bulkhead 29 at positions spaced upwardly from the floor member 28.

It will be seen now that the track elements formed by the tubular members 24 are rigidly mounted within the pilot's compartment in a spaced apart parallel relationship and each extends upwardly and forwardly with respect to the fore and aft axis of the aircraft, which for the purpose of clearly locating the position of the track elements can be assumed to be substantially parallel to the plane of the floor member 28.

The seat 10 is suspended between the track elements formed by the tubular members 24 through carriage means which, in the illustrated embodiment of the present invention, comprise tubular castings 37 sleeving or circumscribing the members 24 and movable longitudinally of the same. Each casting is provided with a pair of mounting flanges 38 extending outwardly from the opposite sides thereof. The flanges 38 are rigidly secured to relatively heavy metal plates 39 fixed at opposite sides of the seat 10 and further reinforcing the same. The plates 39 are preferably riveted in place as shown, and are formed with spaced openings for passing bolts 41 used to mount the flanges 38 of the carriages formed by the castings 37 to the outer faces of the plates.

It should be understood now that the seat 10 is supported by the tubular members 24 and is movable with the carriage means 37 in a path of movement intermediate of and substantially parallel to the longitudinal axes of the members 24. Thus as the carriage means are moved from a position adjacent the lower ends of the tubular members 24 toward the upper ends thereof, the seat will move upwardly and forwardly of the compartment and when the carriage means are moved from a position adjacent the upper ends of the tubular members 24 toward the lower ends thereof, the seat will move downwardly and rearwardly within the compartment.

It will also be seen that all unusual loads applied to the seat will be taken by the track elements 24 through the carriages 37 fixed to the seat. These elements, formed of relatively heavy walled tubular members, are highly resistant to stress loads and are mounted to stress carrying structure of the aircraft through anchoring members designed to take relatively high loadings.

It is now preferred to incorporate into the seat supporting structure means tending to normally urge the carriages formed by the castings 37 upwardly of the tubular members 24. Although a number of means can be used to bring about this movement of the carriage means, it is now preferred to use a pair of torsion springs 42 sleeving a torque tube 43 transversely mounted beneath the seat member 11 and arcuately movable in a path fixed by a pair of links 44 pivotally interconnecting each end of the torque tube 43 with the adjacent socket member 25. The ends of the links 44 connected to the socket members 25 can be pivotally secured thereto by the bolts 32 which hold the lower ends of the tubular members within the sockets.

Each link 44 is pivotally connected to one of the opposite ends of the torque tube 43 at a point spaced from the free end of the link and the portion of the link extending beyond the pivotal connection of the torque tube takes the torque thrust of one of the torsion springs 42. This may be easily accomplished by forming the free end of each link 44 with a laterally extending finger 46 which is engaged with the outer end of the adjacent spring 42. The opposite or inner ends of the springs 42 are fixed to the torque tube 43 by bolts 47 carried by eyes formed at the inner ends of the springs and passed through the torque tube 43 and held by conventional nuts. Fixed to the opposite ends of the torque tube 43 are rigid, laterally extending arms 48, the free end of each arm being pivotally connected by means of a bolt 49 to the mounting flange 38 of the adjacent casting 37.

The springs 42 are mounted in such a manner that the ends engaged with the fingers 46 of the links 44 tend to swing the links 44 upwardly, as viewed in Figures 1 and 2, and in the direction of the arrow 51 shown in Figure 5. The inner ends of the springs anchored to the torque tube 43, on the other hand, apply torque forces to the tube 43 in the direction of the arrow 52 illustrated in Figure 5, to thus swing the rigid arm 48 carried at opposite ends of the tube in the direction of the arrows 53, that is, in a counterclockwise direction as viewed in Figure 5.

As a result of the forces exerted by the springs 42, there is, through the arms 48, a force applied to the castings 37 having an upwardly directed component which tends to move the same upwardly of the tubular track elements 24. Although the forces transmitted by the arms 48 to the castings 37 are not coaxially directed relative thereto, the upwardly directed component thereof nevertheless is always so directed that the castings will move upwardly of the tubular track members 24. Springs of different sizes and shapes may be used, although the forces created by the springs 42 should always be sufficiently great to raise the entire seat member so that the seat will move upwardly to the extent possible if no loads are carried by the seat.

To reduce friction losses, the castings 37 each carry roller elements 54, which, as clearly shown in Figure 1, are rotatably carried at opposite ends of the castings 37 and on opposite sides thereof so that the roller elements of each casting engage diametrically spaced portions of the tubular track element 24 circumscribed by the casting to which they are mounted. Each roller element 54 is preferably formed with a peripherally extending groove for receiving the cylindrical surface of the track element over which the roller moves.

To hold the seat in some preselected desired position other than the extreme elevated position to which it is normally urged by the springs 42, means are provided for holding the carriages 37 in any one of a plurality of positions along the track elements 24. In the preferred embodiment of the invention illustrated, this means comprises a pin 55 slidably mounted in an opening formed in a boss 56 integral with each casting 37. The pin 55 of each carriage is adapted to be received within any one of a plurality of spaced apertures 57 formed in the wall of the tubular track element 24 over which the carriage moves. The pins 55 are normally urged into positions in which they are engageable with the apertures 57 although actuating means are provided for withdrawing the pins from the apertures in which they are engaged to permit the carriages formed by the castings 37 to be moved longitudinally of the track elements 24.

The pin actuating mechanism, referring now to Figure 5, comprises a pair of arms 58 each having one end pivotally connected to the outer end of a pin with the opposite end fixed to a bearing member 59. The bearing members are telescopically fitted over the opposite ends of a torque tube 61 extending transversely of the seat at the rear of the back rest 12. The bearing members 59 are rotatably passed through aligned apertures formed in the plates 39 fixed as above described to opposite sides of the seat 10. Each bearing member 59 is secured to the end of the torque tube to which it is telescopically mounted by a fastening element, such as the bolt 62, and rotates or revolves with the tube.

An arm 63, having one end rigidly fixed to the torque tube 61, extends downwardly therefrom and is pivotally connected at its free, lower end by means of a suitable pivotal connection 64 to an elongate actuating link 65 disposed beneath the seat member 11 and extending forwardly to terminate in a bifurcated terminal member 66. Secured pivotally between the tines of the terminal member 66 is one end of an arm 67 rigidly connected at its opposite end to one leg 68 of an L-shape operating member 69. The leg 68 is rotatably mounted in aligned apertures formed in a U-shape mounting bracket 70 secured to the undersurface of the seat member 11, which the longer leg extends upwardly through an elongate slot formed in a guide member 71 fixed to the face of one of the wing or side members 14.

A torsion spring 72 sleeving the leg 68 has one end anchored to the arm 67 while its opposite end is anchored to a fixed pin 73 connecting the two legs of the U-shaped bracket 70 and reinforcing the same.

The spring 72, mounted to the leg 68, is so arranged that the arm 67 is urged in a counterclockwise direction to draw the link 65 to the left, as viewed in Figure 5. This movement of the link 65 in turn moves the arm 63 in a clockwise direction and consequently the torque tube 61 is also rotated in a clockwise direction to conjointly swing each of the arms 58 in the same direction and urge the pin 55 connected thereto into an aperture 57 upon registry of an aperture with the opening of the boss 56 in which the pin is mounted. It will thus be seen that the spring 72 tends to maintain the pins 55 engaged in a selected pair of apertures 57 which will hold the carriages formed by the castings 37 against movement longitudinally of the track elements 24.

To withdraw the pins 55 from the apertures with which they are engaged, the L-shaped operating member 69, normally held in the position illustrated in Figure 5 by the spring 72, can be moved in a clockwise direction which results, by the arm and linkage mechanism just described, in a counterclockwise movement of the arms 58 to which the pins 55 are pivotally connected. This movement of the arms 58, as best shown in Figure 3, will withdraw the pins 55 from the apertures in which they are engaged to free the carriages 37 for movement longitudinally of the track elements 24.

In the use of the seat of the present invention, a pilot may change his spatial position within the pilot's compartment easily and without any great exertion, for after the pins 55 have been withdrawn from the apertures to which they are engaged, by merely raising himself from the seat 10, the latter will move upwardly and forwardly within the compartment because of the thrust component brought about by the torsion springs 42 and their related structure interconnecting the torque tube 43 and the castings 37.

When the seat 10 has been moved upwardly and forwardly in the compartment to the spatial position desired by the pilot, he can then release the operating member 69 which, through the action of the spring 72 as should now be understood, will result in movement of the pins 55 into a position in which each pin will immediately engage an aperture 57 upon alignment of the aperture with the bore in which the pin is mounted. Once the pins 55 are engaged with the aperture formed in the track members 24, continued upward movement of the carriages are arrested and the seat will be held in the desired preselected position of spatial adjustment within the compartment.

To lower the seat as well as to move it rearwardly within the compartment, the pilot remains seated and merely moves the operating member 69 in a clockwise direction which, as previously explained, withdraws the pins 55 from the apertures in which they have been engaged. In the absence of the torsion springs 42, the carriages 37 and consequently the seat 10 would immediately move to the lowest position of adjustment possible. As the torsion springs tend to move the carriages 37 upwardly of the track elements 24, they consequently resist downward movement of the seat due to the weight of the pilot and his gear.

By a careful selection of the springs 42, the same can be made to almost overcome the downwardly directed force on the seat 10 created by the weight of the pilot and his gear to the end that the carriages 37 move slowly down the tracks 24 upon withdrawal of the pins 55 from the apertures with which they were engaged. When the seat has been move downwardly and rearwardly into the new position of adjustment desired by the pilot, the operating member 69 is released after which the spring 72 will again indirectly move each pin 55 into engagement with an aperture 57 as soon as the aperture moves into alignment with the bore in which the pin is slidably mounted to hold the seat in the new position of adjustment.

The pilot need not be seated to adjust the position of the seat for he may place his one foot in the depression 21 and apply the desired force downwardly after the pins 55 have been withdrawn from the track elements to move the chair downwardly to any one of the positions defined by the apertures 57. It is possible, of course, to adjust the seat upwardly by this procedure by merely applying a force sufficient to slow down the action of the springs 42 when the operating member 69 has been moved to the position necessary to release or withdraw the pins 55.

It might be pointed out here that the socket members 33 form stop elements for limiting upward movement of the carriages 37. It will be seen, referring now to Figure 1, that engagement of each upper roller element 54 with the undersurface of each socket 33 prevents further movement of the carriages 37. Thus it is not necessary for the pilot to "fish" for the uppermost set of apertures 57. Instead he may merely withdraw the pins 55 and allow the springs 42 to move the carriages upwardly to the limit position defined by engagement of the upper roller elements 54 with the socket members 33.

It should be seen now that the seat of the present invention is one which permits, with little exertion on the part of the occupant, spatial adjustment of the position of the seat within a compartment. The amount of forward movement of the seat of the present invention relative to the amount of vertical movement can, of course, be varied by merely varying the angularity of the track elements 24. For example, if a seat is desired which moves forwardly a greater amount than it does vertically, the track elements 24 may be mounted at a greater angle from the vertical. The reverse is, of course, also true for if the track elements are mounted at a smaller angle to the vertical than herein shown, the chair will move vertically a greater distance than it will horizontally.

An important feature of the chair of the present invention is the ease of adjustment, which, as previously explained, is due in most part to the particular arrangement of the torsion springs 42 and their associated elements which coact together to move the carriages 37 upwardly when the weight of the pilot is partially removed from the seat and which coact together to slowly lower the seat when the entire weight of the pilot and his gear is taken by the seat.

The seat is designed to take relatively high loads which might be produced by either change of acceleration or direction of flight of the airplane, or by a "crash" landing. It should be appreciated that the track elements 24 and the means used to mount these elements are well able to take extremely high forces. This is also true of the carriage means, formed by the castings 37 and the roller elements 54, and which are rigidly mounted to high stress resisting plates rigidly fixed to the seat proper. The pins 55, unlike similar detent means used in previously proposed chairs, are not subject to loads imposed on the chair such as would be the case upon a "crash" landing. The pins 55 merely hold the carriage means against movement once they are engaged with the apertures 57 formed in the wall of the tubular track elements 24.

Although the weight of the pilot and his gear are in part taken by the pins 55, there is little danger of the pins being sheared off as they can be easily designed to take relatively high shear as well as compression loads.

Although the now preferred embodiment of the seat of the present invention has been shown and described herein, it is to be understood that the invention is not to be limited thereto, for it is susceptible to changes in form and detail within the scope of the appended claims.

We claim:

1. An adjustable seat for an operator of a vehicle having an operator's compartment defined in part by a substantially vertical wall extending transversely of said vehicle, comprising: a pair of elongate tubular track elements; means spacedly fixed to the lower extremity of said wall for mounting the lower ends of said track elements to said wall; an elongate support element rigidly interconnecting the upper end of each track element and said wall at a position spaced upwardly from said mounting means, said support element rigidly holding the upper ends of said track elements forwardly spaced from said wall whereby said track elements extend in parallelism upwardly and forwardly of said wall; a chair-like member including a seat element and a back rest; and tubular carriage means fixed to opposite sides of said member and each sleeving the adjacent track element for mounting said member to said track elements for movement in a path intermediate and substantially parallel to said track elements whereby the position of said member within said compartment can be varied.

2. An adjustable seat of the type described for use in an operator's compartment, comprising: a pair of support elements inclined to the vertical forwardly relative to said compartment; a body receiving member including a seat and a back rest; carriage means fixed to opposite sides of said body receiving member and engageable with said support means for movement therealong and movably mounting said body receiving member between said support elements; a bar transversely extending of said body receiving member; means associated with said carriage means for mounting said bar for movement in a fixed arcuate path; means, including a torsion spring sleeving and engaging said bar, engaging said bar mounting means and normally acting to simultaneously urge said carriage means to positions at the upper ends of said support elements whereby said body receiving member is normally urged bodily in a path substantially parallel to said support elements toward an elevated position relative to said support elements; and means, including means operable by an occupant by the body receiving member for holding said carriage means against movement, whereby said body receiving member can be held in a preselected position relative to said support elements.

3. An adjustable seat for an operator of a vehicle having an operator's compartment defined in part by a substantially vertical wall extending transversely of said vehicle, comprising: a pair of elongate tubular track elements; means spacedly fixed to the lower extremity of said wall for mounting the lower ends of said track elements to said wall; an elongate support element rigidly interconnecting the upper end of each track element and said wall at a position spaced upwardly from said mounting means, said support element rigidly holding the upper ends of said track elements forwardly spaced from said wall whereby said track elements extend in parallelism upwardly and forwardly of said wall; a chair-like member including a seat element and a back rest; carriage means including a relatively short tubular member fixed to each side of said member and sleeving the adjacent track element; a roller carried at opposite sides of each tubular member and engaged with opposite sides of the track element sleeved by the tubular member for mounting said chair-like member intermediate said track elements for movement in a path substantially parallel to said track elements whereby the position of said member within said compartment can be varied; detent means carried by each of said tubular members and normally engaged with cooperating means carried by said track elements for holding said carriage means in preselected positions of adjustment on said track elements whereby the relative position of said member within said compartment may be preselectedly fixed; carriage moving means engaging said carriage and including torque transmitting means associated therewith; and means for simultaneously moving said detent means out of engagement with said cooperating means to free said tubular members for movement longitudinally of said track elements, movement of said tubular members in one direction moving said chair-like member upwardly and forwardly within said compartment, movement of said tubular members in the opposite direction moving said chair-like member rearwardly and downwardly within said compartment.

4. An adjustable seat for an operator of a vehicle, comprising: a pair of tubular track elements; means for rigidly mounting said track elements within the operator's compartment of the vehicle in parallel relationship at a forwardly extending angle to the vertical; a tubular carriage sleeving each track element and movable longitudinally thereof; a chair-like member including a seat and a back rest; means for securing one of said carriages to each side of said member whereby said member is movable with said carriages as the same move longitudinally of said track elements; an elongate torque transmitting means transversely arranged beneath said member; a laterally extending arm rigidly carried at each end of said means; means pivotally connecting the free end of each arm to the adjacent carriage fixed to each side of said member; a link pivotally connected at one end to each mounting means; means pivotally connecting a link to each end of said elongate means whereby the latter is movable in an arcuate path fixed by said links; at least one torsion spring sleeving said elongate means; means anchoring one end of said spring to said elongate means; means for connecting the opposite end of said spring to a link; said spring creating forces tending to move said carriages upwardly on said track elements to carry said member upwardly and forwardly within said compartment; means carried by each carriage and engageable with a selected one of a plurality of means longitudinally spaced on each track element for holding said carriages in one of a plurality of preselected positions on said elements; and means, including manually controlled means, for withdrawing said means from engagement with the means of said track elements whereby said carriages may be moved relative to said elements to adjust the position of said member within said compartment.

5. An adjustable seat for an operator of a vehicle, comprising: a pair of tubular track elements; means for rigidly mounting said track elements within the operator's compartment of the vehicle in parallel relationship at a forwardly extending angle to the vertical; a tubular carriage sleeving each track element; a roller element fixed to the opposite ends of each carriage at opposite sides thereof and engageable with the track member to which the carriage is mounted; said roller elements supporting said carriages on said track elements for movement longitudinally thereof; means for securing one of said carriages to each side of said member whereby said member is movable with said carriages as the same move longitudinally of said track elements; a torque transmitting rod transversely arranged beneath said member; a laterally extending arm rigidly carried at each end of said rod; means pivotally connecting the free end of each arm to the adjacent carriage fixed to each side of said member; a link pivotally connected at one end to each mounting means; means pivotally connecting a link to each end of said rod whereby said rod is movable in an arcuate path fixed by said links; at least one torsion spring sleeving said rod; means anchoring one end of said spring to said rod; means for connecting the opposite end of said spring to a link; said spring creating forces tending to move said carriages upwardly on said track elements to carry said member upwardly and forwardly within said compartment; means carried by each carriage and engageable with a selected one of a plurality of means longitudinally spaced on each track element for holding said carriages in one of a plurality of preselected positions on said elements; and means, including manually controlled means, for withdrawing said means from engagement with the means of said track elements whereby said carriages may be moved relative to said elements to adjust the position of said member within said compartment.

6. An adjustable seat for an operator of a vehicle having an operator's compartment defined in part by a substantially vertical wall extending transversely of said vehicle, comprising: a pair of elongate tubular track elements; means spacedly fixed to the lower extremity of said wall for mounting the lower ends of said track elements to said wall; an elongate support element rigidly interconnecting the upper end of each track element and said wall at a position spaced upwardly from said mounting means, said support element rigidly holding the upper ends of said track elements forwardly spaced from said wall whereby said track elements extend in parallelism upwardly and forwardly of said wall; a chair-like member including a seat element and a back rest; carriage means fixed to opposite sides of said member and each sleeving a track element for mounting said member intermediate said track elements for movement in a path substantially parallel to said track elements whereby the position of said member within said compartment can be varied; detent means carried by said carriage means and engageable with cooperating means carried by said track elements for holding said carriage means in preselected positions of adjustment on said track elements whereby the relative position of said member within said compartment may be preselectedly fixed; a torque transmitting member; pivotally mounted link means interconnecting the lower portion of said track elements and said carriage mounting said torque transmitting member transversely of said seat element for movement in an arcuate path; a pair of torsion springs sleeving said torque transmitting member, the inner ends of said springs being fixed to said torque transmitting member, the opposite ends thereof engaged with said link means and applying reaction forces thereto in a direction to normally urge said torque transmitting member upwardly; said link means comprising rigid arms carried at opposite ends of said torque transmitting member; means pivotally connecting the free end of each arm to a carriage means whereby said carriage means are urged upwardly along said track elements; and means for moving said detent means out of engagement with the means carried by the track elements.

CHARLES W. DEMAREST.
JOHN T. WILLOUGHBY.

References Cited in the file of this patent
UNITED STATES PATENTS

| Number | Name | Date |
|---|---|---|
| 870,692 | Shepard | Nov. 12, 1907 |
| 2,312,473 | O'Hare | Mar. 2, 1943 |
| 2,485,111 | Robins | Oct. 18, 1949 |